(No Model.)
J. A. FRENCH.
SCOOP.
No. 264,072. Patented Sept. 12, 1882.
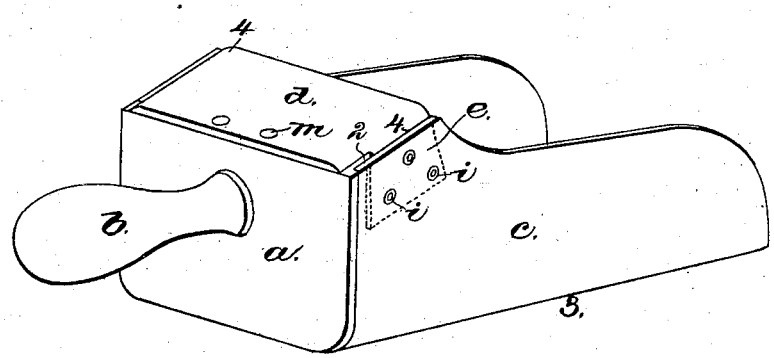
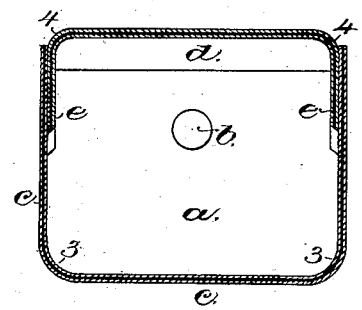
Witnesses.
John F. C. Brinkert
Fred A. Powell
Inventor:
John A. French
by Crosby & Gregory
Attys.

UNITED STATES PATENT OFFICE.

JOHN A. FRENCH, OF CAMBRIDGE, MASSACHUSETTS.

SCOOP.

SPECIFICATION forming part of Letters Patent No. 264,072, dated September 12, 1882.

Application filed August 8, 1882. (No model.)

*To all whom it may concern:*

Be it known that I, JOHN A. FRENCH, of Cambridge, county of Middlesex, State of Massachusetts, have invented an Improvement in Scoops, of which the following description, in connection with the accompanying drawings, is a specification.

My invention is embodied in a wooden scoop of that class in which the blade portion of the scoop consists of a multiply veneer the different layers of which have their grain in different directions, the said veneer being bent to the proper shape to form the blade, which is fastened upon a head-piece of thicker board provided with a suitable handle. In scoops of this class the blades have usually been curved or cylindrical, and the material held on the blade and banking up against the head is likely to be spilled over the upper edge of the head of the scoop.

My invention consists mainly in the combination, with the blade of multiply veneer, of the handled head of the scoop and a wooden hood extending out from the said head and fastened to the sides of the blade portion, the said hood being shown as also made of a piece of multiply veneer bent to form wings, which rest against and are fastened to the sides of the blade, thus materially adding to the strength and durability of the scoop. The blade is shown as having its bottom portion flat and its sides bent at substantially right angles thereto, this form being very convenient for removing material from the bottom of a box or other flat surface.

Figure 1 is a perspective view of a scoop embodying this invention, and Fig. 2 a vertical transverse section thereof.

The head *a*, of a single piece of board, preferably rabbeted, as shown at 2, and provided with a handle, *b*, (shown as screwed therein,) and the blade *c*, of several plies or thicknesses of veneer cemented or glued together with the directions of their grain intersecting, are substantially the same as in scoops heretofore in use, except that the head *a* is substantially rectangular instead of semicircular in shape, and the blade *c* has a flat bottom and flat sides, it being bent twice, as shown at 3, at about right angles, and with as short curvature as possible without injury to the grain of the veneers.

In order to enable the scoop to retain, when in a substantially vertical position, the material gathered upon its blade when in a horizontal position, it is provided with a hood, *d*, (shown as also made of multiply veneer bent twice at right angles, as shown at 4,) thus providing wings *e*, which are overlapped by and fastened to the sides of the blade *c*, as by the rivets *i*. The wings *e* are recessed, as shown in Fig. 1, to receive the head *a* of the scoop, the main portion *d* of the hood being shown in this instance as overlapping the upper edge of the said head *a*, and being fastened thereto, as by the fastenings *m*. The hood *d*, with its wings, serves to strengthen the sides of the blade *c*, thus forming an extremely strong, durable, and at the same time convenient and neatly-appearing scoop.

I claim—

1. As an improved article of manufacture, the herein-described scoop, consisting of the head provided with a handle, the blade of multiply veneer, and the hood connected with the said blade and head, substantially as and for the purpose set forth.

2. The combination of the head, provided with a handle, with the blade and the hood of multiply veneer, provided with wings which are fastened to the sides of the blade, substantially as and for the purpose described.

3. The head *a*, substantially rectangular in shape, combined with the blade *c*, of multiply veneer bent twice at right angles, and having a flat bottom and sides, and the hood *d*, attached to the said blade and head, substantially as described.

4. The head *a*, rabbeted as described, and the blade *c*, of multiply veneer, fastened to the said head, combined with the hood *d*, having recessed wings *e*, the said hood being fastened to the upper edge of the head *a* and its wings being riveted to the sides of the blade *c*, substantially as described.

In testimony whereof I have signed my name to this specification in the presence of two subscribing witnesses.

JOHN A. FRENCH.

Witnesses:
G. W. GREGORY,
JOS. P. LIVERMORE.